(12) United States Patent
Özcelik et al.

(10) Patent No.: US 6,233,277 B1
(45) Date of Patent: May 15, 2001

(54) REDUCED-MEMORY VIDEO DECODER FOR COMPRESSED HIGH-DEFINITION VIDEO DATA

(75) Inventors: Taner Özcelik, Palo Alto; Dzung Tien Hoang, San Jose, both of CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/285,567

(22) Filed: Apr. 2, 1999

(51) Int. Cl.[7] ............................. H04N 7/12; H04N 11/02; H04N 11/04
(52) U.S. Cl. ............................. 375/240.02; 375/240.12; 382/236
(58) Field of Search ................. 375/240.02, 240.12; 382/236, 238, 245, 254, 191, 240, 253; 360/48; 348/399, 400, 403, 411–418, 420, 422; H04N 7/12, 11/02, 11/04

(56) References Cited

U.S. PATENT DOCUMENTS

| | | | |
|---|---|---|---|
| 5,451,949 | * | 9/1995 | Gundry ............................. 341/143 |
| 5,627,601 | * | 5/1997 | Ran et al. ......................... 348/413 |
| 5,777,677 | * | 7/1998 | Linzer et al. ..................... 348/415 |
| 5,777,812 | * | 7/1998 | Kim ................................. 360/48 |
| 5,818,530 | * | 10/1998 | Canfield et al. ................... 348/400 |
| 5,844,614 | * | 12/1998 | Chong et al. ..................... 348/420 |
| 5,862,266 | * | 1/1999 | Hunter ............................. 382/254 |
| 6,005,983 | * | 12/1999 | Anderson et al. ................ 348/416 |

OTHER PUBLICATIONS

Decoder Complexity And Performance Comparison Of Matching Pursuit And DCT–Based Video Codecs, Ralph Neff, Toshio Nomura, Avideh Zakhor, IEEE, pp. 783–787, Jan. 1998.*

* cited by examiner

*Primary Examiner*—Howard Britton
*Assistant Examiner*—Nhon T Diep
(74) *Attorney, Agent, or Firm*—Wood, Herron & Evans, L.L.P.

(57) ABSTRACT

A video decoder for decoding compressed high-definition video data. The video decoder includes a down-converter and an up-converter placed in the decoder's data path to reduce the amount of video data that needs to be stored in frame buffer memory. Reference frame video data is decimated and low-pass filtered by the down-converter for storage in a frame buffer memory. The up-converter uses interpolation and low-pass with high boost filtering to reconstruct the reference frames on-the-fly for use in motion compensated prediction.

24 Claims, 3 Drawing Sheets

REDUCED-MEMORY VIDEO DECODER FOR COMPRESSED HIGH-DEFINITION VIDEO DATA

FIELD OF THE INVENTION

The present invention relates generally to decoding of digitally encoded video signals and, more particulary, to a video decoder and method for decoding compressed high-definition video data.

BACKGROUND OF THE INVENTION

Digital encoding and decoding of high-definition video signals provides higher image resolution and more effective control of the storage, manipulation and display of the video signal over existing analog NTSC and PAL video systems. In an HDTV environment, for example, digital video data is encoded at a transmission end in accordance with a specified compressed bitstream syntax, such as the MPEG-2 standard, and decoded at a receiving end in accordance with a specified decoding process. The decoded video signal is reconstructed at the receiving end into picture frames that may be presented for display with an HDTV resolution of 1920× 1080 or reduced to a standard NTSC resolution of 720×480.

Decoding of compressed video signals is a memory-intensive process, especially for compressed high-definition video signals. Receivers adapted to decode compressed high-definition video signals generally require a significant amount of memory to store reference frame data and additional side information required in the decoding process. In the past, for example, a typical HDTV receiver for decoding a high-definition MPEG-2 video bitstream has required 12 MB or more of random-access-memory (RAM) to provide adequate memory storage of control information and reference frame video data in the receiver for reconstructing the transmitted picture frames.

Due to the relatively high cost of high speed memory, developers of HDTV receivers have sought to reduce the amount of memory required in the receiver for the decoding process. In the past, one approach has been to exploit only a portion of the compressed data in the transmitted HDTV signal to produce a decoded video signal representing an image of lesser resolution. For example, HDTV receivers have been designed in the past that decimate the decoded video data in accordance with a predetermined decimation scheme either before or after the inverse discrete transform function of the decoder to reduce the amount of video data that is stored in memory for reconstruction of the picture frames.

Decoded DCT coefficients may be decimated by masking a block of DCT coefficients of an 8×8 DCT coefficient array before the remaining coefficients are applied to the IDCT circuit of the decoder. Alternatively, particular rows and columns of pixel data generated by the IDCT circuit in an 8×8 pixel data array may be eliminated to reduce the amount of video data that must be stored. The reconstructed picture frames are then displayed at a lower NTSC resolution.

While this approach requires less memory in the decoder for reconstructing picture frames, the decimation scheme performed by the decoder may result in reduced picture quality as a portion of the decoded video data is eliminated during the decoding process. Furthermore, since only a limited portion of the decoded video data can be eliminated without completely sacrificing picture quality, the decimation scheme achieves only a modest amount of compression and is not readily adaptable for memory-scalable applications where the amount of decoder memory may vary among different decoding applications.

One technique for conserving memory is to use DCT based compression and decompression as described in U.S. patent application Ser. No. 09/178,980, entitled "Reduced Memory Video Decoder for Compressed High-Definition Video Data", filed on Oct. 26, 1998, and assigned to the assignee of this application. DCT compression is a very accurate compression process that has minimal data loss; however, DCT compression is relatively complicated. If the computational resources are capable of processing a DCT compression, then DCT compression should be used. However, if the computational resources are limited and not sufficient to process DCT compression, then other processes must be found to down-convert the data for storage.

Thus, there is a need for a video decoder and method for decoding compressed high-definition video data that provides visibly good quality reconstructed picture frames for relatively small memory requirements, for example, 2 megabytes or less.

SUMMARY OF THE INVENTION

The present invention overcomes the foregoing and other shortcomings and drawbacks of compressed video signal decoders and decoding methods heretofore known. The video decoder of the present invention permits substantial down-converting of video data with limited processing power into a memory. Further, in one embodiment, the video decoder of the present invention is sensitive to different picture complexities and continuously modifies the down-converting and up-converting process to optimize picture quality. Thus, the video decoder of the present invention provides better picture quality than other known decoding processes where the processor is limited.

In accordance with the principles of the present invention, a video decoder includes a macroblock (MB) parser and VLD circuit for parsing the incoming compressed video bitstream and decoding the block-level quantized DCT coefficients and motion vectors that are required in the frame or field reconstruction process. The decoded DCT coefficients are applied to an inverse quantization (IQ) and inverse Discrete Cosine Transform circuit to generate pel values (I-frames) or pel prediction errors (P- and B-frames) for each block of video data. The decoded motion vectors are applied to a motion compensator circuit. Reconstructed I- and P-reference frame video data are reduced in a down-converter by decimating and low-pass filtering to provide down-converted data for storage in the memory. During the decoding of predictive P- and B-frames, corresponding reference frame video data is retrieved from frame buffer memory and applied to an up-converter which interpolates and low-pass with high boost filters the down-converted data to generate corresponding up-converted data. The up-converter provides data from I- and P-reference frames on-the-fly for use in motion compensated prediction.

In accordance with another embodiment of the invention, the down-converter and the up-converter are adaptive in that the slope of the filter cutoff between sharp and gradual cutoff values is chosen as a function of a video signal-noise complexity.

In a further embodiment of the invention, a method of down-converting by decimating and adaptive low-pass filtering and up-converting by interpolating and adaptive low-pass with high boost filtering is provided utilizing a spatio-temporal adaptive Gaussian filter.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiment given below, serve to explain the principles of the invention.

DETAILED DESCRIPTION OF SPECIFIC EMBODIMENTS

Figure 1:
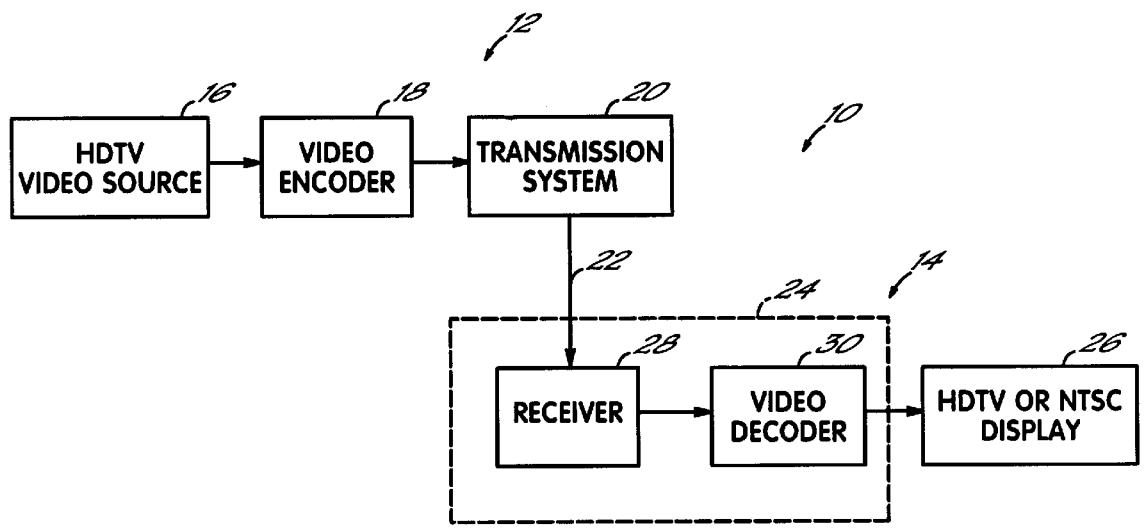
FIG. 1 is a block diagram illustrating transmitting and receiving ends of a video system in an HDTV environment.

Referring to FIG. 1, an HDTV environment 10 is shown including an HDTV signal transmitting station 12 and an HDTV signal receiving and display station 14. The transmitting station 12 includes an HDTV video source 16 for generating high-definition video data in an uncompressed format, a video encoder 18 for compressing the video data from HDTV source 16 into a video data bitstream that complies with a predetermined bitstream syntax, and a communications transmission system 20 for transmitting the compressed video data bitstream over a communications link 22 to the receiving and display station 14 of the HDTV environment 10. The video encoder 18 compresses the high-definition video data received from the HDTV video source 16 into, for example, an MPEG-2 compliant video data bitstream, as specified by the Moving Pictures Expert Group in ISO-13818-2, to remove spatial and temporal redundancies in the video data before it is transmitted in a compressed format by the transmission system 20. The transmission system 20 is adapted to transmit the compressed video data bitstream across the communications link 22, for example, via radio, satellite, cable, DVD recording or other suitable delivery means to the receiving and display station 14.

The receiving and display station 14 includes an HDTV receiver 24, such as a set-top-box converter, for receiving and decompressing the transmitted video data bitstream 22 to generate a sequence of picture frames for display on a TV or other suitable display 26. The HDTV receiver 24 includes a receiver 28 that is signal compatible with the transmission system 20 for receiving the transmitted video data bitstream over the communications link 22. As will be described in greater detail below, video decoder circuitry 30 receives The compressed video data bitstream from receiver 28 and decompresses the Video data bitstream to reconstruct a sequence of Intra (I-), Predictive (P-) and Bidirectionally Predictive (B-) frames of picture data for presentation to display 26.

Video encoder 18 preferably uses the MPEG-2 bitstream syntax to compress video data from video source 16. The MPEG-2 standard defines a compressed bitstream format for video data and control information representing a sequence of images in six layers, including the sequence layer, the group of pictures (GOP) layer, the picture layer, the slice layer, the macroblock (MB) layer and the block layer. Each of these layers includes a unique start code which identifies the layer and provides either fixed length data values or variable length Huffman encoded data, or both, which must be a parsed and decoded by video decoder 30 at the receiving and display station 14 in accordance with the MPEG-2 decoding process. More detailed descriptions of the MPEG-2 bitstream syntax, MPEG-2 decoding process and implementation of the standard MPEG-2 encoder are contained in the ISO-13818-2 (MPEG-2) and the Test Model 5 Rate Control Model both of which are expressly incorporated herein by reference in their entirety. It will be appreciated by those of ordinary skill in the art that while the MPEG-2 bitstream format and decoding process is described herein in accordance with one embodiment of the present invention, the present invention may be used with other compressed bitstream formats and decoding process standards without departing from the spirit and scope of the present invention.

Figure 2:
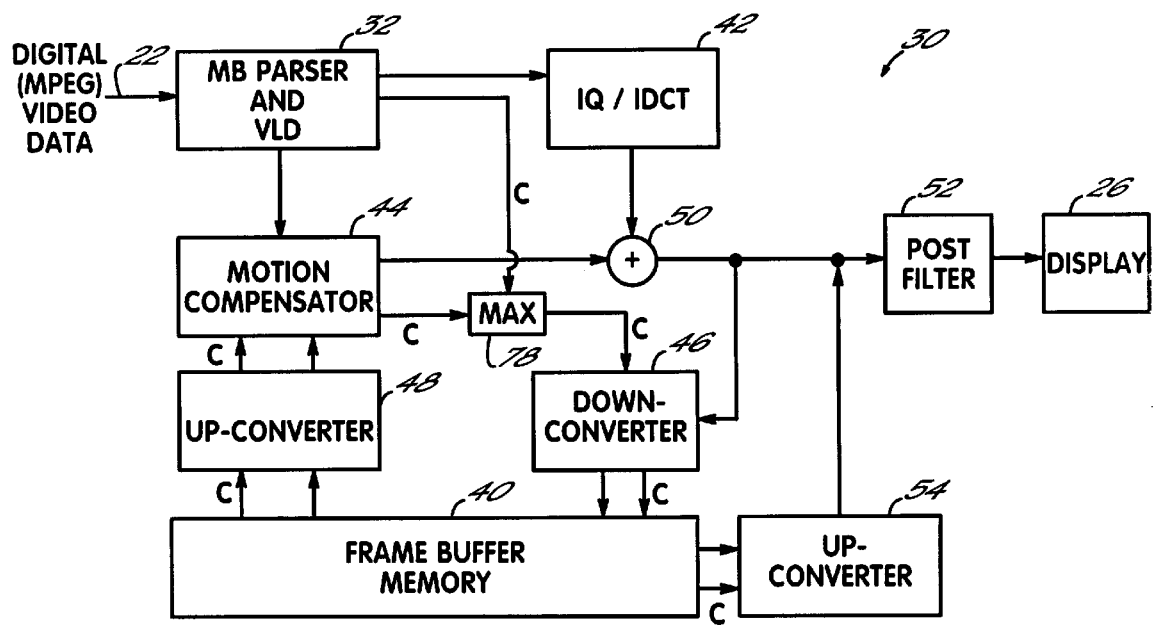
FIG. 2 is a block diagram illustrating a reduced-memory decoder for decoding compressed high-definition video data in accordance with the principles of the present invention.

Video decoder 30 is the focus of the present invention and its operation and features are best understood with reference to FIGS. 2 and 3, Video decoder 30 is controlled by a processor (not shown) that controls the decoding process of the received video data bitstream 22 to reconstruct the I-, P-, and B-picture frames for sequential display as specified in the MPEG-2 standard. The high definition video data bitstream 22 may be transmitted with an HDTV resolution of 1920×1080, while display 26 may be adapted to display the reconstructed picture frames with the same or a lesser resolution. For example, the decoded high-definition video data bitstream may be down-converted from the HDTV resolution of 1920×1080 to a lower NTSC resolution of 720×480 for display on a standard-definition (SD) TV.

With further reference to FIG. 2, video decoder 30 includes a macroblock (MB) parser and variable length decoder (VLD) circuit 32 for parsing the incoming compressed video data bitstream 22 and decoding the block-level quantized DCT coefficients and motion vectors that are necessary to reconstruct each frame or field. The compressed DCT coefficients and motion vectors are decoded using variable length code (VLC) tables defined in the MPEG-2 standard that are accessible by video decoder 30 during the decoding process.

In accordance with the MPEG-2 standard, each macroblock (MB) represents an image area covering a matrix of 16×16 pixels. Further, each macroblock may comprise four 8×8 blocks of luminance information representing the 16×16 matrix of pixels, and two 8×8 blocks of chrominance information representing the 16×16 matrix of pixels. Alternatively, for interlaced video, a video frame is formed of two fields, one containing the even scan lines of a picture (the "top field") and one containing the odd scan lines of the picture (the "bottom field"). To permit processing of decoded reference frames uniformly as fields, regardless of whether those pictures were encoded as field or frame pictures, each macroblock may comprise eight 8×8 blocks of luminance information representing the 16×16 matrix of pixels, and two 8×8 blocks of chrominance information representing the 16×16 matrix of pixels in a 4:2:0 chrominance format. The video decoder 30 is adapted to decode each 8×8 transformed block of video data (DCT coefficients) to generate 8×8 blocks of reconstructed I-, P- or B-frame video data (pel values). The pel values for I- and P-frames are stored in a down-converted format in frame buffer memory 40, while reconstructed B-frame pel data is presented for immediate display on display 26.

During reconstruction of the transmitted I-, P- and B-frames, decoded DCT coefficients are applied in an 8×8 array to an inverse quantization (IQ) and inverse Discrete Cosine Transform (IDCT) circuit 42 to generate pel values (I-frames) or pel prediction errors (P- and B-frames) for each block of video data, while decoded motion vectors are applied to a motion compensator circuit 44. The transmitted or encoded video data of a reference I-frame does not include motion vector data and, accordingly, each encoded block represents an 8×8 array of transformed pel values. Encoded video data representing P-frames includes blocks of video data not contained in reference I- or P-frames, as well pel prediction errors between the predicted frame and the last I- or P-reference frame. Video data representing encoded B-frames includes pel prediction errors between the predicted frame, the preceding reference frame and the following reference frame. Motion vectors are encoded to identify 8×8 blocks of reference frame video data from which the P- and B-frames are generated. The reference I- and P-frame blocks used to reconstruct the predictive frames most closely match the block currently being processed. Encoding and decoding of I-, P- and B-frames is described in detail in the earlier referenced ISO-13818-2.

In accordance with the MPEG-2 decoding process, the decoding sequence of the I-, P- and B-frames does not necessarily coincide with the display sequence of the frames. Thus, as described in greater detail below, video data of I- and P-reference frames is stored in a down-converted format in frame buffer memory 40 until required for presentation to display 26 or for reconstruction of other predictive frames, while B-frames are reconstructed from stored I- and P-frames "on-the-fly" for immediate display.

With further reference to FIG. 2, video decoder 30 includes an down-converter 46 and an up-converter 48 in the data path of the decoder 30 to reduce the amount of reference frame video data that needs to be stored in frame buffer memory 40 to reconstruct I-, P- and B-frames. For example, in some applications, frame buffer memory 40 may have about 2–4 MB of dynamic random-access-memory (DRAM) for storing two reference frames of video data in a compressed format as well as other side information to permit reconstruction of the transmitted I, P- and B-frames as described in detail below. When I-frames are being processed, each decoded 8×8 block of DCT coefficients is applied from the MB parser and VLD circuit 32 to the IQ/IDCT circuit 42 for generating 8×8 blocks of pel values in the I-frame. The decoded pel values of the I-frame pass through an adder 50 to the down-converter 46 where the 8×8 blocks of pel values are down-converted before being written as fixed length down-converted video data into frame buffer memory 40.

The decoder 30 receives 8×8 blocks of P-frame DCT coefficients immediately after the I-frame from which the P-frame was predicted at the video encoder 18. The decoded DCT coefficients of the P-frame are applied to the IQ/IDCT circuit 42 to generate 8×8 blocks of pel prediction errors which are then applied to adder 50. The motion compensator circuit 44, responsive to decoded motion vectors from the MB parser and VLD circuit 32, accesses up to four blocks of down-converted I-frame pel data from frame buffer memory 40 which are up-converted by up-converter 48 and applied to the motion compensator circuit 44. The motion compensator circuit 44 applies the corresponding decoded I-frame pel data to adder 50 which sums the I-frame pel data with the P-frame pel prediction errors applied from the IQ/IDCT circuit 42. The sums produced by the adder 50 are the pel values of the P-frame which are also preferably down-converted by the down-converter 46 before being stored in frame buffer memory 40. B-frames are decoded similarly to P-frames, and the reconstructed B-frame pel data is applied to post filter 52 for immediate presentation to display 26.

Post filter 52 is provided to adjust the aspect ratio of the reconstructed I-, P- and B-picture frames, as well as to combine sub-picture information with the reconstructed I-, P- and B-frames. When I- and P-frame data is to be presented for display, the down-converted I- and P-frame pel data from frame buffer memory 40 is up-converted by an up-converter 54 and applied to post filter 52 for presentation to display 26.

Figure 3A:
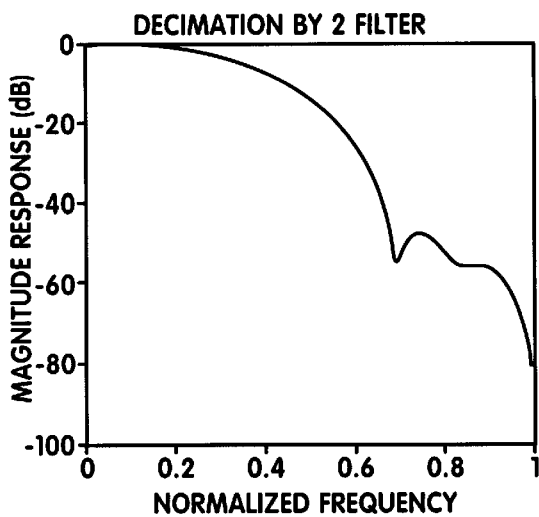
FIGS. 3A–3F are frequency response plots for low-pass and low-pass with high-boost filters within respective down and up converters in the decoder of the present invention.
Figure 3B:
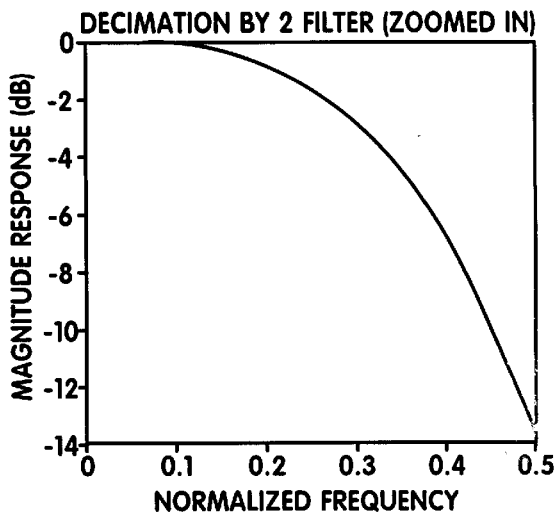
Figure 3C:
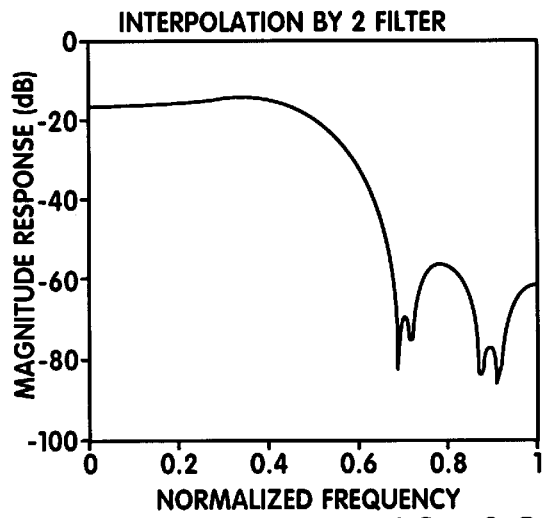
Figure 3D:
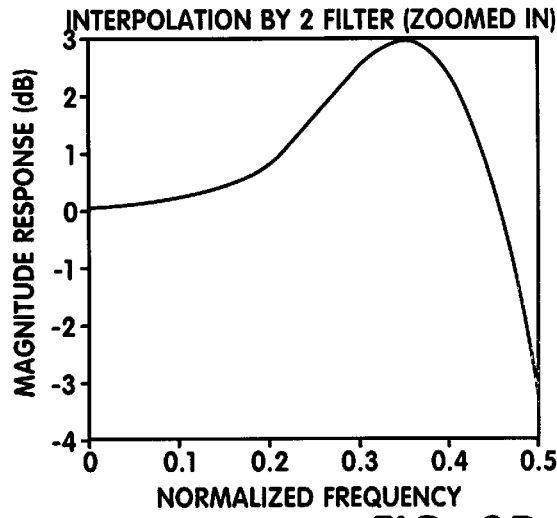
Figure 3E:
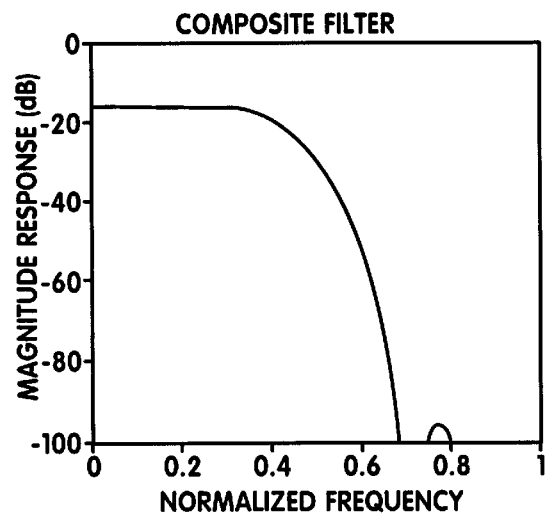
Figure 3F:
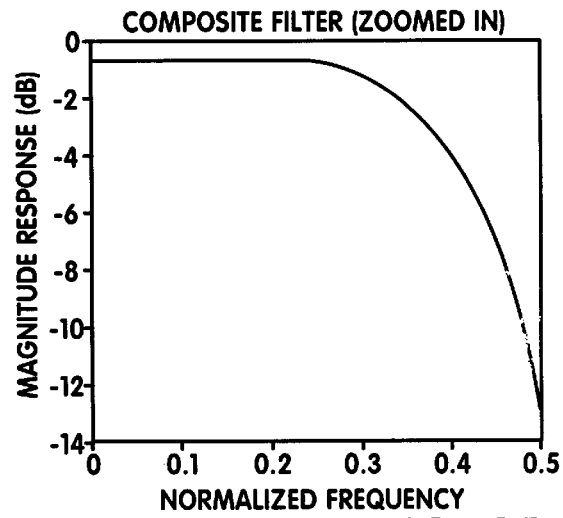

In any down-converting process, it is highly desirable to maintain accuracy of the video image. If only simple decimation of the video signal is used, the video averaging process results in aliasing artifacts in complex video images. In one embodiment the down-converter 46 is a decimator with a low pass filter and the up-converters 48, 54 are interpolators with low-pass with high boost filters. The low pass filter is designed to reduce aliasing effects in the decimation process, and the low pass filter has a frequency response as shown in FIGS. 3A and 3B. The low-pass with high-boost filter is similarly designed to reduce aliasing effects, and the frequency response of the low-pass with high-boost filter is shown in FIGS. 3C and 3D. The parameters of the low-pass with high-boost filter are determined such that successive low-pass and low-pass with high-boost filtering results in a relatively flat frequency response in the pass band as shown in FIGS. 3E and 3F. The down-converter 46 can be implemented using any known digital filter that provides the a desirable reduction, for example, in accordance with the size of the available memory 40. Preferably, the down-converter 46 is a polyphase finite impulse response ("FIR") filter; and the up-converters 48, 54 can be similarly designed.

The down-converter 46 and up-converters 48, 54 are very effective, but they utilize fixed filter parameters and are not responsive to the wide range of video that may be encountered. Highly complex video can be visualized as a picture with a high degree of contrast, that is, a picture having immediate and significant variations in luminance which produces very visible transitions between light and dark or sharp edges. With more complex video, the down-converted video should as much as possible replicate the complexity of the original video. To achieve that goal, referring to FIG. 4, in another embodiment, an adaptive down-converter 47 includes a decimator with an adaptive low-pass filter 56 that processes highly complex video with a very sharp filter cutoff, so that aliasing artifacts are reduced and the filtered video more closely follows the input video. A sharp cutoff filter will have greater bandpass ripple and thus, will add a certain noise character to the video. However, such noise is generally visually lost in the luminance transitions in a highly complex picture.

If a sharp filter cutoff is applied to less complex video, the resultant noise is more perceptible and undesirable. Less complex video can be visualized as a picture that has little contrast, that is, a picture having only gradual transitions in luminance which does not produce sharp edges. Therefore, the filter cutoff should be set to have a more gradual cutoff. A more gradual filter cutoff provides much less discernable video noise and provides a filter output that better matches the video being processed.

To accommodate both of the above situations, the adaptive low-pass filter portion of the decimator 56 has a variable frequency cut-off that is adjusted as a function of the complexity of the video data. With highly complex video, the filter cutoff parameter control 64 adjusts the low pass filter portion of decimator 56 to have very sharp cutoffs, so that the output of the decimator 56 more closely follows the sharp transitions in the video. However, with less complex video, the filter cutoff parameter control 64 adjusts the adaptive low-pass filter portion of the decimator 56 to have a more gradual filter cutoff, thereby providing a filter output that better matches the video being processed.

There are several schemes that may be used to determine the complexity of the video. An 8×8 luminance block can contain up to 64 DCT coefficients. One coefficient represents DC or average brightness information, and each of the remaining coefficients convey information relating to different image spatial frequency spectra. The coefficients are arranged in a particular order and are generally encoded from the lower frequencies to the higher frequencies. The variance in the pixel domain can be observed by looking at the activity of the nonzero higher frequency DCT coefficients. Generally, the greater the activity; the busier the image and the greater the value of the signal-noise complexity value. Thus, the higher frequency coefficients can be used as a signal-noise complexity measure for controlling the low-pass filter portion of the decimator 56 to avoid aliasing effects and to provide minimal impact on picture quality. Thus, with reference to FIG. 2, one approach to determine a picture signal-noise complexity value (C) is to utilize encoded DCT coefficients output from the macroblock parser 32. As will be appreciated, other data may be used as an indicator of a signal-noise complexity value, for example, motion vectors, etc. Thus, based on the encoded DCT coefficients, a signal-noise complexity value C is assigned to a block of video data and buffered in the filter cutoff parameter control 64. The filter cutoff parameter control 64 determines a filter cutoff value in response to a signal-noise complexity value C and applies the filter cutoff to the adaptive lowpass filter portion of the decimator 56 of the adaptive down-converter 47. This signal-noise complexity value C is then stored with the down-converted data produced by adaptive low-pass filter 56 and decimation filter 58.

Figure 5:
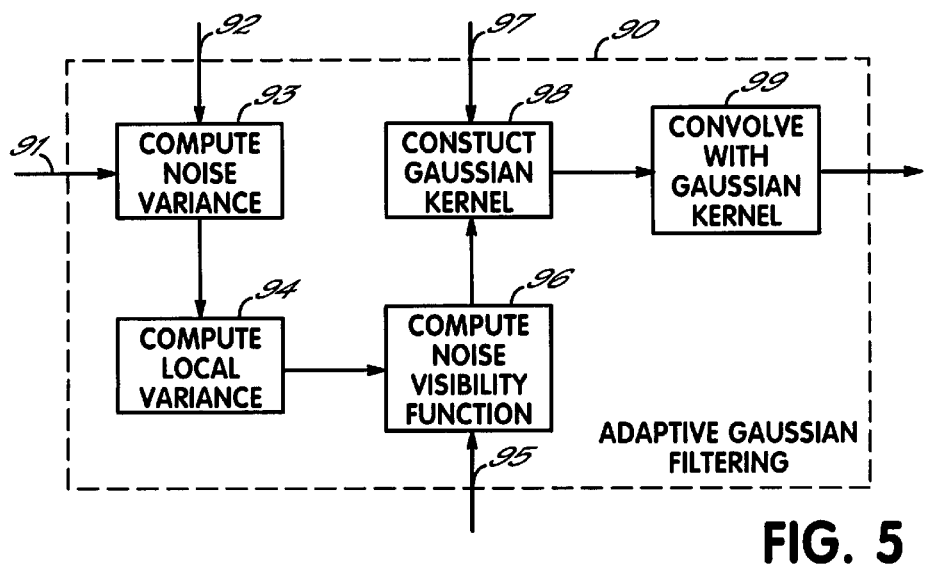
FIG. 5 is a block diagram of a filtering algorithm for providing an adaptive Gaussian filtering in accordance with the principles of the present invention.

In another embodiment, the adaptive filter portion of the decimator 56 is a spatio-temporal adaptive Gaussian filter as described at pages 50–53 of a Northwestern University doctoral thesis entitled "A Very Low Bit Rate Codec", dated December 1994 and authored by Mr. Taner Özcelik, an inventor of the present application, which thesis is hereby incorporated in its entirety by reference herein. Spatio-temporal noise can be destructive by not allowing the efficient removal of the spatio-temporal redundancy present in image sequences. With this embodiment, a filtering technique is employed for removing noise in both the spatial and temporal domains. The original input images are first filtered in a spatially adaptive manner in order to preserve the edges while suppressing the noise in more visible areas, namely, the smooth areas. Referring to FIG. 5, a block diagram of this adaptive Gaussian filtering algorithm 90 is illustrated. Input data, for example, from the decimation filter 58 or the interpolation filter 82, is provided on a first filter input 91. The noise is assumed to be Additive White Gaussian and the signal-to-noise ratio ("SNR") is assumed to be known and provided on a second input 92. The algorithm first computes the noise variance at 93 based on the observed signal and the given SNR. Then at 94, the local variances of the signal are then computed with the knowledge of the local noise variances. A tuning parameter that must be adjusted experimentally for each class of images is provided on an input 95. Based on the local signal variances and the tuning parameter, a noise visibility function is computed at 96 according to the following equation:

$$V(\Theta) = \frac{1}{1 + \frac{\sigma_f^2}{\sigma_n^2}\Theta}$$

where:
  $\Theta$ is the tuning parameter
  $\sigma_f^2$ is the local noise variance
  $\sigma_n^2$ is the local variance of the signal Using the visibility function and a base variance of the kernel provided on input 97, the Gaussian filtering coefficients are computed at 98 for the Gaussian kernel as follows:

$$g(m, n) = \frac{1}{Z} e^{-\left[\frac{m^2+n^2}{V(\Theta)\sigma_g^2}\right]}$$

where:
  Z is a normalizing coefficient
  $\sigma_g^2$ is the base variance of the Gausian kernel Thereafter at 99, the Gaussian filter coefficients are used to filter the original image. With this algorithm, a separate kernel is constructed for each pixel location taking into account the visibility of the noise in the local neighborhood. Thus, for instance, in the spatially active regions of the image, the local variance is high, the noise is less visible, and therefore, mild filtering will be performed. In the areas of the image where the noise is highly visible, a more severe filtering (smoothing) is performed. According to this method unnecessary smoothing of the edges which may be visually annoying is avoided.

Figure 4:
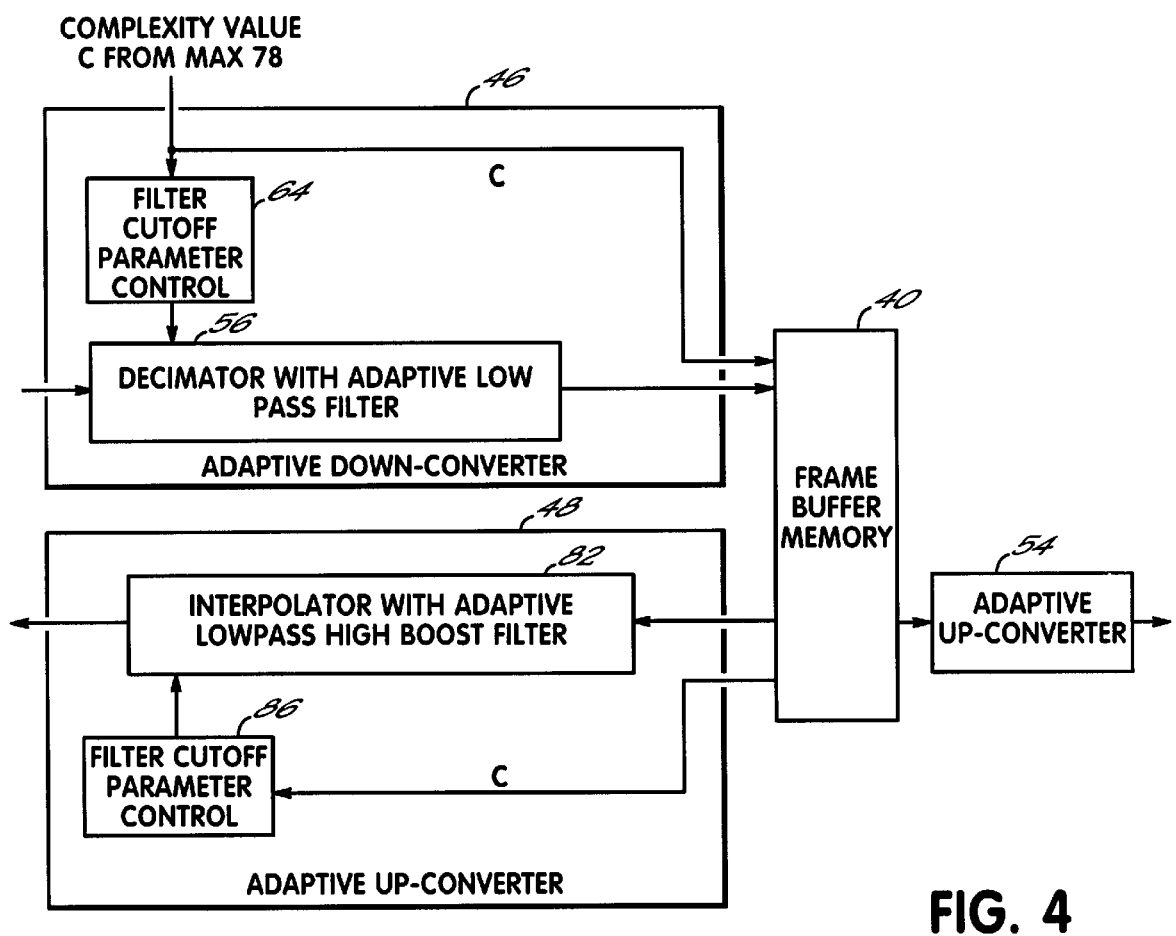
FIG. 4 is a partial block diagram illustrating one embodiment of the down-convert and up-convert circuits of the decoder in greater detail.

Upon a frame of video data, for example, a P-frame being read from memory, it passes through an adaptive up-converter 49 having an interpolator with an adaptive low-pass with high-boost filter 82. The adaptive up-converter 49 of FIG. 4 is an alternative embodiment of the up-converter 48 of FIG. 2 and includes the interpolator with an adaptive low-pass with high-boost filter 82 and a filter parameter cutoff control 86. The interpolator 82 can be implemented using any known digital filter that provides interpolated video signal elements for the video signal elements stored in the memory 40. The interpolator 82 includes an adaptive low-pass with high-boost filter portion having a varying cutoff corresponding to the adaptive low-pass filter portion of the adaptive down-converter 47. The low-pass with high-boost filter character is determined such that the result of successive low-pass and low-pass with high-boost filtering results in a relatively flat frequency response in the pass band as shown in FIGS. 3E and 3F. A filter parameter cutoff control 86 receives a signal-noise complexity value C stored in the frame buffer memory 40 and associated with the frame of video being up-converted. The filter parameter cutoff control 86 uses the signal-noise complexity value C to adjust the filter cutoff of the adaptive low-pass with high-boost filter portion of the interpolator 84. The adaptive low-pass with high-boost filter portion has filter cutoffs that generally follow the filter cutoffs of the adaptive low-pass filter portion of the decimator 56, that is, sharper filter cutoffs for more complex video data and smoother filter cutoffs for less complex video data. Both filters operate on video data of similar signal-noise complexity with similar filter cutoff values; however, the output from the adaptive low-pass with high-boost filter portion of the interpolator 84 is approximately the mirror image of the output from the adaptive low-pass filter portion of the decimator 56.

During the decoding process performed by video decoder 30 (FIG. 2), the decoding of P- and B-frames requires the summation of video data being processed by the MB parser and VLD circuit 32 with previously processed video data stored in the frame buffer memory 40 and up-converted by the adaptive up-converter 49. Generally, the video data from being processed by the MB parser and VLD circuit 32 has a signal-noise complexity value different from the signal-noise complexity value of the stored data. Thus, in this situation, a signal-noise complexity value must be determined and stored with the summed video data.

Examining that process in more detail, referring to FIGS. 2 and 3, as reference blocks of video data are retrieved from frame buffer memory 40 for reconstruction of P-frames, up to four blocks of reference frame video data may be up-converted by the adaptive up-converter 49 and applied to motion compensator circuit 44. Each block of reference frame video data will have stored with it the signal-noise complexity value C used by the adaptive down-converter 47 of video encoder 18 to down-convert the block of reference frame video data. Those same signal-noise complexity values C are used by the adaptive up-converter 49 to up-convert the blocks of reference frame video data for the motion compensation circuit 44. The motion compensator circuit 44 determines the maximum one of the up to four signal-noise complexity values C of blocks used by the adaptive up-converter 49, and applies the maximum signal-noise complexity value C to the MAX circuit 78.

In processing currently decoded video, the MB parser and VLD circuit 32 obtains a signal-noise complexity value (C) used by video encoder 18 (FIG. 1) to encode each macroblock of DCT coefficients; and that signal-noise complexity value is also applied to the maximum (MAX) circuit 78 (FIG. 2). The MAX circuit 78 applies the higher of the two signal-noise complexity values it receives to the adaptive down-converter 47. In this way, the highest signal-noise complexity value C will be used by adaptive down-converter 47 to down-convert each corresponding block of reference frame video data. If, for example, P-frame video data is being processed, that maximum signal-noise complexity value C is then stored in the frame buffer memory in association with the summed P-frame video data from the summing circuit 50.

While not shown, it will be appreciated that with the above alternative embodiment, the up-converter 54 of FIG. 2 is implemented in a similar manner as the adaptive up-converter 49 of FIG. 4 and includes an interpolator with an adaptive low-pass with high boost filter 82. Up-converter 54 also receives a signal-noise complexity value C stored in the frame buffer and uses the signal-noise complexity value to adjust a filter cutoff of an adaptive low-pass with high-boost filter portion of an interpolator 82. Further, as will be appreciated, the up-converter 54 may include a video noise filter to provide the desired video output.

Those of ordinary skill in the art will appreciate that the video decoder 30 of the present invention requires only a small memory 40 while providing a reasonable quality reconstructed picture frame, thereby allowing for memory-scalability for different decoding applications.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicant's general inventive concept.

Having described the invention, what is claimed is:

1. Apparatus for decoding a stream of compressed video data, wherein the stream includes variable length encoded data representing image areas of transmitted frames, comprising:

decoding circuitry for decoding the variable length encoded data to generate corresponding decompressed data for reconstruction of the transmitted frames;

a memory connected to the decoding circuitry;

a down-converter connected to the decoding circuitry and the memory for decimating and low-pass filtering selected decompressed data generated by the decoding circuitry to provide down-converted data for storage in the memory; and an up-converter connected to the memory and the decoding circuitry for interpolating and low-pass with high boost filtering selected down-converted data stored in the memory to generate corresponding up-converted data, wherein the decoding circuitry is operable to reconstruct one or more of the transmitted frames from the decompressed data generated by the decoding circuitry and the up-converted data generated by the up-converter.

2. The apparatus of claim 1 wherein the down-converter further comprises a decimator with a low-pass filter.

3. The apparatus of claim 2 wherein the up-converter further comprises an interpolator with a low-pass with high boost filter.

4. The apparatus of claim 3 wherein the low-pass filter and the low-pass with high boost filter have fixed filter cutoffs.

5. The apparatus of claim 3 wherein the low-pass filter and the low-pass with high boost filter have variable filter cutoffs.

6. The apparatus of claim 5 wherein the variable filter cutoffs are determined as a function of a signal-noise complexity.

7. The apparatus of claim 6 wherein the signal-noise complexity is derived from the variable length encoded data.

8. The apparatus of claim 6 wherein the signal-noise complexity is derived from the decompressed data.

9. The apparatus of claim 8 wherein the signal-noise complexity is derived from DCT coefficients obtained from the variable length encoded data.

10. The apparatus of claim 6 further comprising a filter parameter cutoff control provides filter cutoffs for the low-pass filter and the low-pass high boost filter as a function of the signal-noise complexity.

11. The apparatus of claim 10 wherein the memory stores the signal-noise complexity with the down-converted data.

12. The apparatus of claim 1 further comprising a display connected to the decoding circuitry for displaying the reconstructed transmitted frames.

13. Apparatus for decoding a stream of compressed video data, wherein the stream includes variable length encoded data representing image areas of transmitted frames, comprising:

decoding circuitry for decoding the variable length encoded data to generate corresponding decompressed data for reconstruction of the transmitted frames;

a memory connected to the decoding circuitry;

an adaptive down-converter connected to the decoding circuitry and the memory for adaptively low-pass filtering and decimating selected decompressed data generated by the decoding circuitry to provide down-converted data for storage in the memory, the adaptive low-pass filtering being responsive to a signal-noise complexity of the decompressed data; and an adaptive up-converter connected to the memory and the decoding circuitry for up-converting selected down-converted data stored in the memory to generate corresponding up-converted data, wherein the decoding circuitry is operable to reconstruct one or more of the transmitted frames from the decompressed data generated by the decoding circuitry and the up-converted data generated by the adaptive up-converter.

14. A method for decoding a stream of compressed video data, wherein the stream includes variable length encoded data representing image areas of transmitted frames, comprising:

decoding the variable length encoded data to generate corresponding decompressed data for reconstruction of the transmitted frames;

low-pass filtering and decimating selected decompressed data as a function of a signal-noise complexity of the decompressed data to generate down-converted data;

writing the down-converted data in a memory;

reading the down-converted data from the memory;

interpolating and low-pass with high-boost filtering the down-converted data as a function of the signal-noise complexity of the decompressed data to generate corresponding up-converted data; and selectively combining the decompressed data generated during the decoding step and the up-converted data generated during the up-converting step to reconstruct one or more of the transmitted frames.

15. The method of claim 14 further comprising adjusting filter cutoffs of the low-pass and the low-pass with high-boost filtering in response to the signal-noise complexity of the decompressed data.

16. The method of claim 15 further comprising providing a more sharp cutoff for the low-pass and the low-pass with high-boost filtering in response to the decompressed data having a greater signal-noise complexity.

17. The method of claim 16 further comprising providing a less sharp cutoff for the low-pass and the low-pass with high-boost filtering in response to the decompressed data having a lesser signal-noise complexity.

18. The method of claim 14 further comprising determining the signal-noise complexity as a function of DCT coefficients obtained from the variable length encoded data.

19. The method of claim 18 further comprising determining the signal-noise complexity as a function of nonzero components of higher frequency DCT coefficients.

20. The method of claim 15 further comprising determining the signal-noise complexity by:

providing a greater signal-noise complexity value in response to the encoded data representing video having more sharp high contrast edges, and providing a less signal-noise complexity value in response to the encoded data representing video having less sharp high contrast edges.

21. The method of claim 14 further comprising displaying the reconstructed transmitted frames.

22. A method for decoding a stream of compressed video data, wherein the stream includes variable length encoded data representing image areas of transmitted frames, comprising:

decoding the variable length encoded data to generate corresponding decompressed data for reconstruction of the transmitted frames;

low-pass filtering and decimating selected decompressed data as a function of a signal-noise complexity of the decompressed data to generate down-converted data;

storing the down-converted data in a memory;

interpolating and low-pass with high-boost filtering selected down-converted data stored in the memory as a function of the signal-noise complexity of the decompressed data to generate corresponding up-converted data; and selectively combining the decompressed data generated during the decoding step and the up-converted data generated during the up-converting step to reconstruct one or more of the transmitted frames.

23. The method of claim 22 wherein the low-pass filtering is spatio-temporal adaptive Gaussian filtering.

24. The method of claim 22 wherein the low-pass with high boost filtering is spatio-temporal adaptive Gaussian filtering.

* * * * *